United States Patent

Hogue

[15] 3,670,169

[45] June 13, 1972

[54] COLOR GRADIENT DETECTOR DEVICE

[72] Inventor: Ephraim W. Hogue, Potomac, Md.

[73] Assignee: The United States of America as represented by the Postmaster General

[22] Filed: Aug. 18, 1970

[21] Appl. No.: 64,724

[52] U.S. Cl..................250/226, 209/111.6, 250/219 DR, 356/176
[51] Int. Cl........................................H01j 39/12
[58] Field of Search..................250/226, 219 DR, 219 DQ; 209/111.6, 111.7; 356/176, 177, 178, 45

[56] References Cited

UNITED STATES PATENTS

| | | | |
|---|---|---|---|
| 3,488,511 | 1/1970 | Mori | 250/219 R |
| 3,512,893 | 5/1970 | Faulhaber | 250/226 |
| 3,516,746 | 6/1970 | Shibata | 250/226 |
| 3,531,208 | 9/1970 | Ward | 356/177 |
| 3,496,370 | 2/1970 | Haville | 250/219 |
| 2,832,257 | 4/1958 | Hunter | 250/226 |
| 3,105,908 | 10/1963 | Burkhardt | 250/226 |
| 3,532,434 | 10/1970 | Jones | 250/226 |
| 3,551,058 | 7/1969 | Dodds | 356/177 |

Primary Examiner—James W. Lawrence
Assistant Examiner—D. C. Nelms
Attorney—Thomas Hayward Brown and Joseph A. Hill

[57] ABSTRACT

A color gradient detector device is disclosed, allowing for the performance of postal meter mark discrimination, which requires a scanning step followed by a signal producing and detecting step. The device has a sensor head connected to an electronic circuit comprising a dual input—single output signal amplifier followed by a signal discriminator and detector.

10 Claims, 8 Drawing Figures

PATENTED JUN 13 1972 3,670,169

INVENTOR.
EPHRAIM W. HOGUE
BY
T. Hayward Brown
ATTORNEY

INVENTOR.
EPHRAIM W. HOGUE
BY
T. Hayward Brown
ATTORNEY

INVENTOR

EPHRAIM W. HOGUE

BY *T. Hayward Brown*

ATTORNEY

COLOR GRADIENT DETECTOR DEVICE

GOVERNMENT ASSIGNMENT

The invention described herein is hereby entirely assigned to the Government of The United States of America.

This invention pertains to a color detecting device and more particularly to a color detecting device which allows for the detection of postal meter mark colors, thus permitting more efficient sorting of mail.

BACKGROUND OF THE INVENTION

At the present time, a machine collates and sorts mail in large post offices before being passed on for handling by postal workers for final disposition. The National Cash Register (NCR) Modification Kit for Pitney-Bowes Mark II, facer-canceller, is the machine used to sort mail. This machine supplemented with this kit responds presently only to stamps with a translucent overcoating or luminescence for the mechanical distribution of mail. As the kit is only responsive to luminescent stamps, non-luminescent material is not sorted.

In the past 6 to 8 years, postal meter marks have become more useful and prevalent in the postal system. A problem created by postal meter marks developed, to wit, they were non-luminescent. In fact, postal meter marks were of the following non-luminescent colors: orange, red, green, purple, blue, black, and brown. Thus, a method to sort postal meter mark mail, said method being responsive to non-luminous color variations, had to be devised.

Many colorimeters exist in the prior art. The uniqueness of mail, however, presents difficult problems for ordinary colorimeters. The colorimeter must only be responsive to color variations and consequently eliminate responses to colorless variations and shades of gray. A uniform dispersion of light must be received by the device to eliminate errors caused by mail envelop wrinkles, creases, scuffs, flaps, and windows.

It is, therefore, an object of this invention to provide maximum amplification of the difference in input signals for the postal meter mark inks to be detected.

It is also an object of this invention to maximize the variation that can be obtained from patterns to be detected.

An additional object of this invention is to minimize error responses that are produced by colorless variations of the envelope surface which include: colorless patterns, wrinkles, creases, flaps, scuffs, and windows, and interference from displacement of the scan element due to variation in the distance of the envelope surface from the integrating window where the photocells are located.

Other objects of this invention will become apparent in the following description.

Devices have appeared in the prior art which utilize the combination of an optical system and sensing means. Rennick in U. S. Pat. No. 2,793,560 describes an optical system including a photosensitive means coupled to an indicating means functioning to analyze color. The Rennick device develops a visual representation of the control signal and correlates said visual representation with the instantaneous position of the light source. As a result, a visual representation is obtained of the chromatic characteristics of the color selective element when the latter is disposed in light intercepting position between the light source and the photosensitive means.

In addition to the foregoing, Nichols in U. S. Pat. No. 2,931,911 describes a detector for optical scanners wherein the photosensitive cells are connected in series and the signal output taken at a point between the two cells. The outputs, consequently, from the two cells are added algebraically; however, like signals will subtract and unlike signals will add to one another.

Although Rennick describes a color analyzer with the combination of an optical system and a sensing head, the Rennick device does not solve the problem of eliminating colorless variations or of being independently responsive to a non-uniform dispersion of light. Specifically, the Rennick control signal is dependent upon the intensity of light impinging upon the photosensitive means. The Nichols device, as well as the Rennick device, does not teach the subtraction of two channeled signals by reversing one channel's polarity which eliminates colorless variations producing equal signals. Additionally, neither of the aforementioned devices teach positioning the plurality of photosensitive cells in juxtaposition to one another to receive reflected radiation emitted in any direction, thus eliminating error due to wrinkles, flaps, etc.

SUMMARY OF THE INVENTION

This invention contemplates a color gradient detector device having an optical scanning head and control circuit wherein said scanning head has a radiant energy source, means for directing said radiant source, a surface upon which said radiation impinges upon a test sample, and light sensor means producing two differentiating signals in said control circuit indicating the color of said test sample.

DESCRIPTION OF THE PREFERRED EMBODIMENTS

Figure 1:
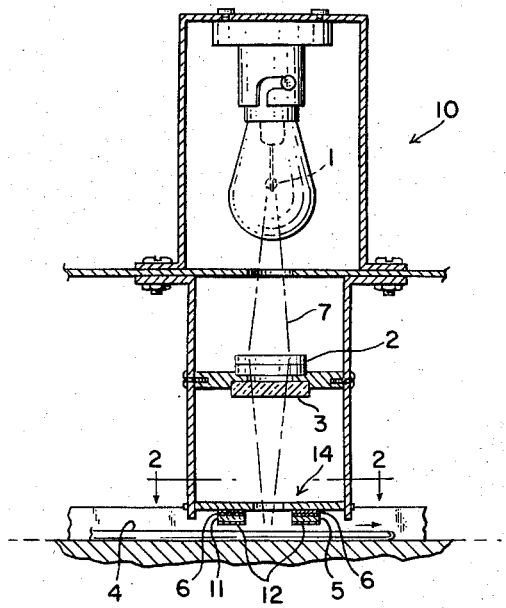
FIG. 1 is an elevation view partially in section of the optical portion of the device.
Figure 6A:
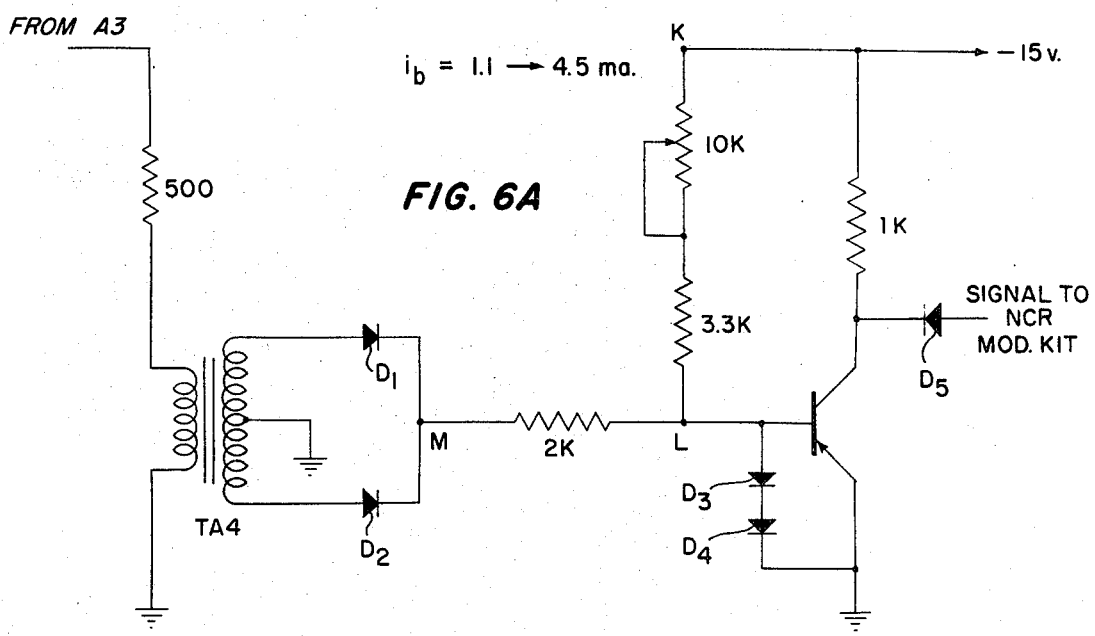
FIG. 6A is a circuit diagram of the discriminator.
Figure 6B:
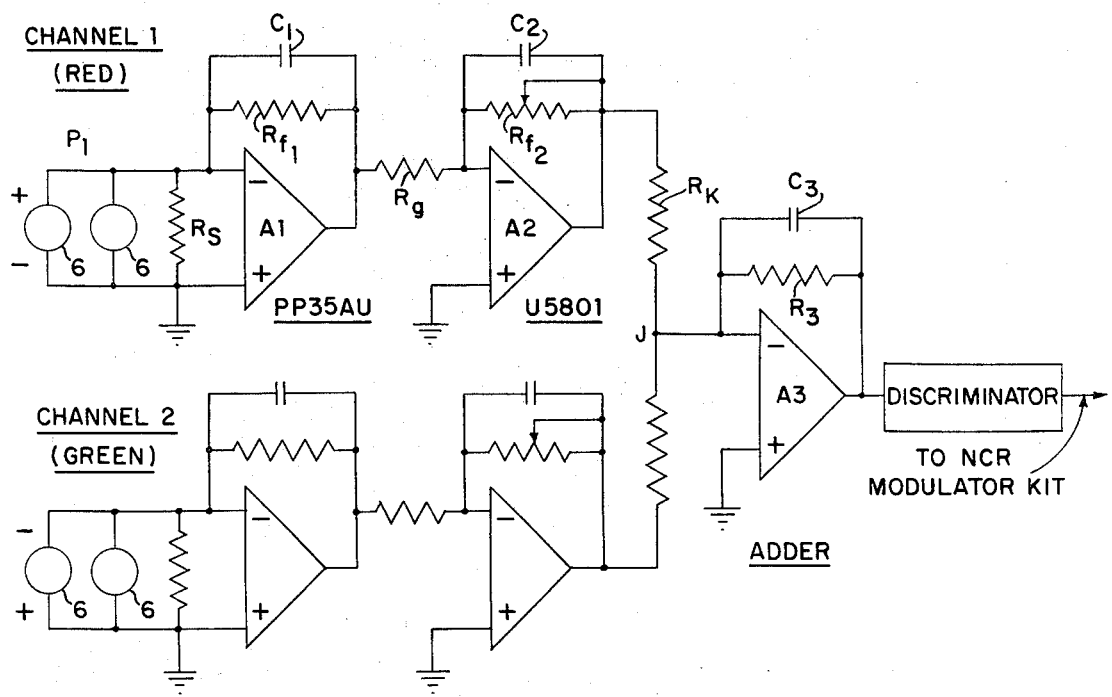
FIG. 6B is a circuit diagram of the signal producing means connected to photosensitive cells on one end and to a signal discriminator on the other.

FIG. 1 is an elevation view partially in section of the optical portion of the color gradient detector device 10, having a scanning head and an electronic package, which is depicted in FIGS. 6A and 6B. The scanning head is composed of a sensor head 14 and illuminator comprising a tungsten lamp filament 1 emitting radiation 7, a high aperture projection lens 2 receiving and directing said radiation 7 from the lamp filament, and a lamp corrective filter 3 receiving and removing most of the infrared radiation from the projection lens. The radiation 7 is directed to the testing surface 4 where the radiation is reflected. The sensor head 14 has a low-loss translucent light integrating window 12, a plurality of parallel-connected photosensitive cells 6, each of said cells behind each red filter 5, and each remaining parallel-connected cell behind each green filter 11. An integrating window is a diffusing plate and is commonly used to uniformly distribute any light that enters the plate.

It is to be noted that the following lengths and values are by way of example only and not to be limited thereto. The lamp in the illuminator is a 12-volt, 25-watt straight coiled filament having a luminous intensity of 32 candelas normal to the filament axis. The bulb mount is adjustable enough to allow the image of the filament to be focused in a plane three-sixteenths of an inch beyond the translucent window, and in the center of its opening, despite allowable variation in lamp dimensions. The optical axis of the very-high-aperture projection lens is normal to the axis of the filament and passes through its center. The lens has a diameter of 25 mm. and a principal focal length of 25 mm. The distance from the lamp filament to its real image on the testing (envelope) surface is approximately 3 ¼ of an inch.

The high aperture lens in the illuminator projects radiation from the lamp through the corrective filter and through an opening in the integrating window to form a magnified real image of the lamp filament at the envelope surface. This very bright image, (a few thousand-foot candles) is the scan element. It measures approximately 0.1 inch wide in the direction of envelope motion in the facer-canceller, by 0.75 inch long along the envelope height. Reflected light from the scan element enters the integrating window and varies in intensity and color with envelope motion when patterns occur that vary in design or color along the line of motion.

Radiation collected from the filament by the lens passes through the corrective filter. The corrective filter consists of three ¼-inch thick blocks of good heat absorbing glass which remove most of the infrared radiation from the illumination of the scan element. The large thickness of glass in the corrective filter slightly reduces the size of the filament image that is obtainable with a given lens.

The purpose of the translucent integrating window is to render the distribution of light between the red and green photocells substantially independent of the small motions of the illuminated scan element that can be caused by envelope surface irregularities and variations in distance from the window. The integrating function of the window also effectively reduces interference from envelope windows.

In the ideal case, the ratio of light entering the red photocells to that entering the green cells will depend only upon its spectral distribution as it leaves the envelope surface, and not at all upon the position or orientation of the scan-element.

Figure 2:
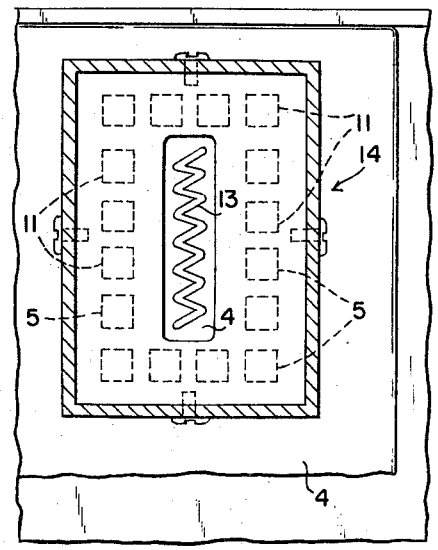
FIG. 2 is a section taken on line 2—2 of the sensor head.
Figure 3:
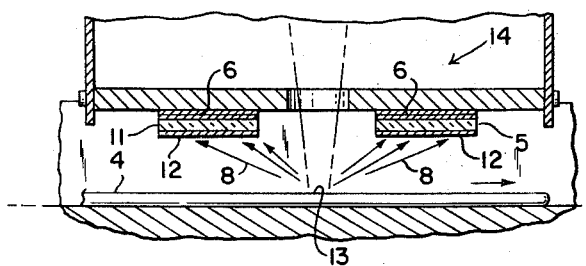
FIG. 3 is an enlarged elevation partially in section of the sensor head.
Figure 4:
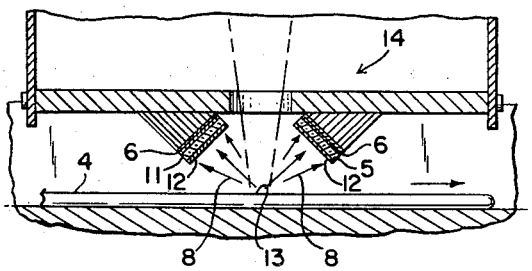
FIG. 4 is an alternate construction and placement of the sensor head.
Figure 5:
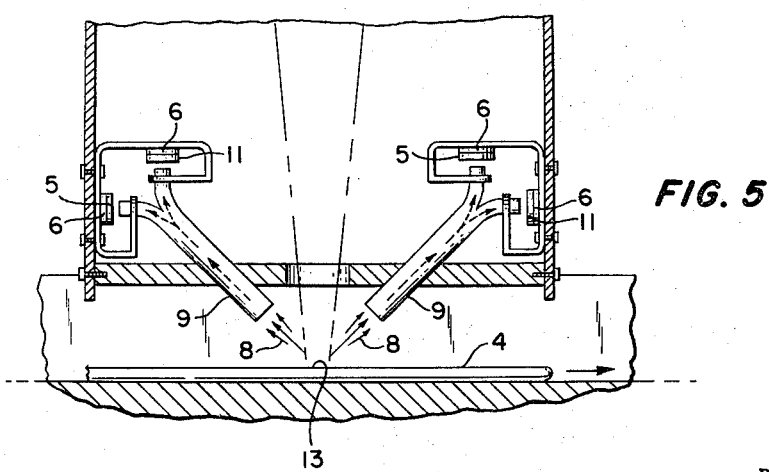
FIG. 5 is a fiber optic construction and placement of the sensor head.

Referring now to the drawings, FIG. 2 is a section taken on line 2—2 of the sensor head and illustrates the placement of the red and green filters in juxtaposition to one another. The filament 1 forms an image 13 on the testing surface 4 through an opening 13 of the sensor head 14. FIG. 3 is an enlarged elevation partially in section of the sensor head additionally showing the reflected rays 8 entering the red and green color filters 5 and 11 and photosensitive cells 6. FIG. 4 is an alternate construction and placement of the sensor head with the difference being the placement of the filters and cells normal to the reflected rays. FIG. 5 is a fiber optic construction and placement of the sensor head illustrating a fiber optic integrating window which renders the reflected radiation insensitive to direction. Any highly integrating (highly diffusing) window, however, will greatly ameliorate the task of minimizing the negative effects of wrinkles, creases, flaps, scuffs and windows on the mail envelopes.

Figure 7:
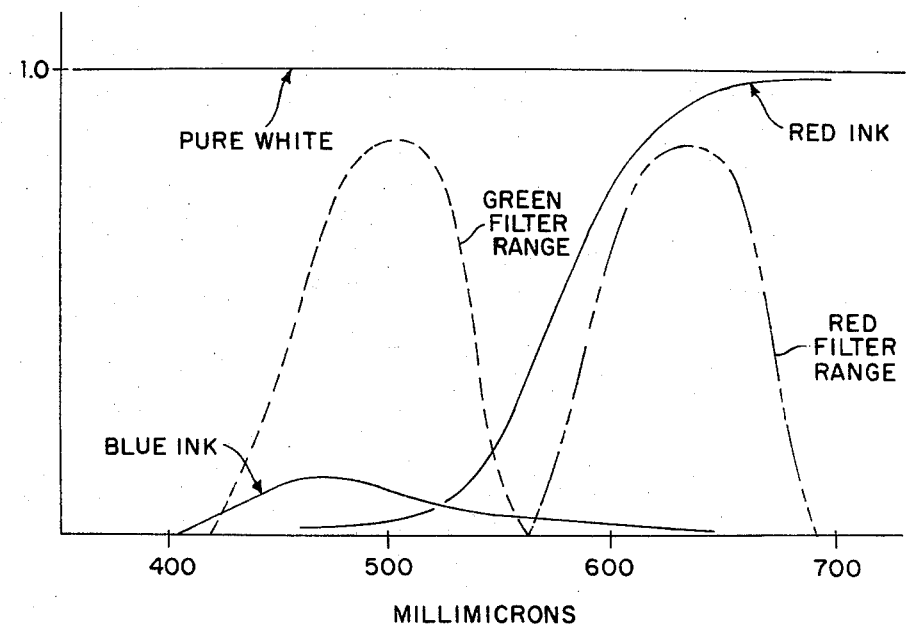
FIG. 7 is a graph of the spectral transmission characteristics of blue and red ink in red and green filter ranges.

The most important rule that is followed in the disposition of the photocells is that they must be arranged in red-green pairs, the members of each pair being kept close together and oriented such that the relative distribution of light flux between them changes as little as possible with motion of the scan-element. This sensitivity to scan-element motion is further reduced by the integrating action of the translucent window. The reflected color radiation is transmitted through the colored filters based on the spectral transmission characteristic of that color through the colored filter. By way of example, FIG. 7 depicts a blue ink having its peak transmission through the green filter at approximately 460 millimicrons and its transmission in the range of the red filter is very low. A red ink has a low transmission in the range of the green filter and a strong transmission, nearly 100 percent, in the red filter range. Nearly all colored inks, therefore, will be unequally transmitted through the different colored filters. Consequently, an unbalanced signal will be produced in the channeled circuits.

As portrayed in FIG. 6B, which is a circuit diagram of the signal producing means connected to photosensitive cells on one end and to a signal discriminator on the other, all photocells with red filters are connected in parallel across the input of the No. 1 (red) channel of the amplifying unit and all photocells with green filters are connected in parallel across the input of the No. 2 (green) channel, but in reverse polarity. The input impedance of each channel is only a few ohms, resulting from negative voltage feedback through a 33K ohm resistor, described as $R_{f1}$, from the output to the input of a high-gain solid-state operational amplifier. With this connection the photocells become current sources, and the amplifier output voltage is simply the total photocell current multiplied by the feedback resistance.

One of the principal features of the invention is to keep the signal generated by each channel a linear function of the light flux on the cell. This is done by providing a low input impedance to the transducer, photocells, in comparison to the transducer's internal impedance. If a linear signal is obtained, the summing signals will subtract correctly, thus giving the proper response.

The electronic package, described in FIGS. 6A and 6B, consists of a dual input-signal output signal amplifier, followed by a signal discriminator, and finally a facer-canceller not illustrated. The amplifier section contains two independent gain-adjustable amplifier channels, 1 and 2. These separately amplify the signals from the red and the green photocells. One channel will be specifically described as both are identical and eventually summed. In fact, the photocells are connected in parallel as is resistor $R_q$. Amplifier $A_1$ is a standard Philbrick PP 35 AU operational amplifier provided with a negative voltage feedback. This feedback amplifier, described in the International Dictionary of Physics and Electronics (Van Nostrand Co., 2nd Ed., 1956, 1961, page 69), is connected in series to a resistor $R_q$ and another amplifying stage containing a highly voltage degenerated inverting gain adjustable standard Philbrick U5801 operational amplifier, with a large current output capability and feedback resistance of 66K ohms. This then, drives the low value (1K ohm) input resistor, $R_k$, of the summing amplifier, $A_3$. The current gain from the photocells to the summing point, J, of the adder is very linear and stable, being determined almost entirely by the operational amplifier feedback networks and the resistor input to the summary point. Because the green photocells are connected in opposite polarity to that of the red, the total current into the summing point equals the difference between the magnitudes of the individual signal currents $S_1$ and $S_2$; and signal voltage from the adder, which is described in Electronic Analog and Hybrid Computers by Granino A. Korn and Theresa M. Korn, (McGraw-Hill, Inc., 1964 page 13), is $(S_1-S_2) R_3$ where $R_3$ is the adder feedback resistance.

Operating, as they do, into an impedance very much lower than their own internal impedance, the photocells generate currents that are linearly proportional to the radiant flux incident upon them. The high degree of linearity produced by the large amounts of negative feedback in the amplifiers then ensures that $S_1$ and $S_2$ are closely linear functions of photocell illumination over a wide range. This is essential. Small capacitors ($30_{pf}$) providing stabilization and phase matching are placed across the feedback resistors of the amplifiers in the red and green channels. The feedback resistor (10K ohms) of the adder is shunted by a capacitor (0.005 $\mu fd$.) to limit the high-frequency content of the difference signal. The overall gain of the amplifier, from one photocell input to the output of the adder, is 0.66 volts per microampere. The nominal sensitivity of silicon photosensitive cells is 20 microamperes per foot-candle per square inch of photocell area. The total area of two Hoffman type 52C silicon cells, such as might be used in parallel for one channel, is just over 0.25 square inch. This gives an electro-optical channel sensitivity of 3.3 volts per foot-candle of illumination on the photocell itself. This assumes that irradiation of the photocell is confined to visual wavelength. Silicon cell have a much higher sensitivity in the near-infrared, and the tungsten lamp has a much higher output in the infrared; but, infrared is substantially removed by the heat-absorbing glass in the illuminator.

The summed current is then introduced to the discriminator portion of the electronic package described in FIG. 6A. The design of the discriminator will provide a low frequency cutoff followed by full-wave rectification, and finally an adjustable DC threshold which can be set to pass fluctuations due to rapid color variation. It will reject the smaller fluctuations resulting from colorless patterns and envelope surface displacements and discontinuities.

The adder, $A_3$, is connected in series to a 500-ohm resistor. The 500-ohm resistor is connected to the primary winding of transformer $TA_4$ which transmits the signal. The transformer's secondary winding has the center tap grounded. The diodes, $D_1$ and $D_2$, are connected to the remaining two terminals providing full-wave rectification. The signals applied to the respective diodes are always opposite in polarity. The bipolar AC signal generated from the adder is, therefore, converted to a positive DC monopolar pulse at the output of the transformer connection, point M. The current generated in the 2K K resistor, located between points M and L and connected in series to the rectifier, is proportional to the fluctuating voltage at the output of the rectifier. The current between points K and L, described as $i_b$ in FIG. 6A, is adjustable and in the range of 1.1 → 4.5 milliamperes, and depends upon the effective resistance between K and L as there is a 10K ohm variable resistor in series with a 3.3K ohm resistor. The current through the 2K ohm resistor must always be greater than $i_b$ in order for the facer-canceller to receive a signal. For example, if the signal transmitted by the transformer is greater than or equal to $i_b$, then the transistor operates as an open switch and the signal generated to the National Cash Register Modification Kit (NCR Mod Kit) and facer-canceller is solely dependent on the (−)15 -volt source, 1K ohm resistor in series with said source, and the impedance of the NCR Mod Kit and facer-canceller. If the signal transmitted by the transformer is less than $i_b$, then the transistor acts as a closed switch and no signal actuates the facer-canceller.

Although the invention has been particularly disclosed, it is to be understood that the invention can be improvised without changing the significant inventive concepts. Radiation may be directed in any manner to the face of the test material. Radiation may be reflected or directed in many ways to a photosensitive means. As long as the signals will cancel when white or black light or shades of gray are present, the difference in polarity concept is viable. The amplification and discrimination of the signal are designated in this patent application by way of example only, and it is also obvious to one skilled in the art that the invention is not to be unduly restricted thereby since modifications may be made in the structure of the various parts without functionally departing from the spirit of the invention.

What I claim is:

1. A color-gradient detector device comprising:
   a. a radiant energy source;
   b. means for directing said energy from said radiant source to a material test sample;
   c. a surface on which said test material is located;
   d. a light sensor means for scanning said material test sample and positioned to receive light from said material therein,
      said light sensor means comprising a plurality of photosensitive cells positioned to receive light from said material test sample, an integrating window positioned between the material test sample and plurality of cells and used to ensure that a uniform distribution of light enters said plurality of cells, and optical band selective means positioned between the integrating window and plurality of cells;
   e. a control circuit communicating and responsive to the output of the light sensor means,
      said control circuit providing a signal representing the color of the material tested in the scanned monitoring area.

2. The device of claim 1 wherein the means for directing said energy from said radiant source to a material test sample comprises:
   a. a projection lens cooperating with said source and directing said energy from said source.

3. The device of claim 1 wherein said optical band selective means comprises:
   a. filtering means adapted to transmit two complementary channeled spectra in two directions,
      said means affixed and transmitting to said photosensitive cells said channeled spectra.

4. The device of claim 3 wherein said filtering means comprises:
   a. mono-chromatic filters
      each said filter of the same color and affixed to each cell and receiving energy light waves from said test material and transmitting same to said respective cell;
   b. different mono-chromatic filters of one other color
      each said filter affixed to each cell and positioned adjacent to each said other colored filter and receiving energy light waves from said test material and transmitting same to said respective cell.

5. The device of claim 1 wherein the output of the sensor means comprises:
   a. two complementary channeled signals
      said first signal generated through a red channel amplifying unit responsive to said red channel filters said second signal generated through a green channel amplifying unit in reverse polarity to said first channel responsive to said green channel filters.

6. The device of claim 1 wherein said control circuit comprises:
   a. a dual input colored amplifying channel comprising
      at least one photo cell in each said channel, any other of said cells connected in parallel to said first cell in each of said channels.

7. The device of claim 6 wherein the control circuit additionally provides amplifying means in each said channel.

8. The device of claim 7 wherein the control circuit additionally provides means for adding and amplifying the differentiating current, said means connected in series and generated from the consolidation of said input channels into a single output.

9. The device of claim 8 wherein said control circuit also provides
   a. an indicating means responsive to the color-representing signal and indicating the color of said tested material.

10. The device of claim 7 wherein said indicating means comprises:
    a. a discriminating means connected in series to the means for adding and amplifying the differentiated current
       said discriminating means transforming the alternating signal emitted from the adding and amplifying means to either a positive or negative direct current signal.

* * * * *